(12) United States Patent
Gulledge

(10) Patent No.: US 11,413,939 B2
(45) Date of Patent: Aug. 16, 2022

(54) FLEXIBLE ELASTIC WINDSHIELD RETAINING CLIP

(71) Applicant: Nivel Parts & Manufacturing Co., LLC, Jacksonville, FL (US)

(72) Inventor: Bryan Gulledge, Kannapolis, NC (US)

(73) Assignee: Nivel Parts & Manufacturing Co., LLC, Jacksonville, FL (US)

( * ) Notice: Subject to any disclaimer, the term of this patent is extended or adjusted under 35 U.S.C. 154(b) by 0 days.

(21) Appl. No.: 17/194,232

(22) Filed: Mar. 6, 2021

(65) Prior Publication Data
US 2021/0188053 A1 Jun. 24, 2021

Related U.S. Application Data

(63) Continuation of application No. 16/100,201, filed on Aug. 10, 2018, now Pat. No. 10,946,727.

(51) Int. Cl.
| | | |
|---|---|---|
| *B60J 1/00* | (2006.01) | |
| *B60J 5/04* | (2006.01) | |
| *B60J 1/06* | (2006.01) | |
| *B60J 1/10* | (2006.01) | |
| *B60J 10/30* | (2016.01) | |

(52) U.S. Cl.
CPC ............ *B60J 1/006* (2013.01); *B60J 1/06* (2013.01); *B60J 5/0487* (2013.01); *B60J 1/10* (2013.01); *B60J 10/30* (2016.02)

(58) Field of Classification Search
CPC ..... B60J 1/006; B60J 5/0487; B60J 1/10; B60J 1/06
USPC .............................................. 296/96.21, 77.1
See application file for complete search history.

(56) References Cited

U.S. PATENT DOCUMENTS

| | | |
|---|---|---|
| 5,385,380 A | 1/1995 | Heavner |
| 5,568,953 A | 10/1996 | Showalter |
| 5,791,720 A | 8/1998 | Moore et al. |
| 5,954,385 A | 9/1999 | Moore et al. |
| 5,975,615 A | 11/1999 | Showalter |
| 7,207,129 B2 | 4/2007 | Buchanan et al. |
| 7,267,388 B2 | 9/2007 | Hanson, Jr. et al. |
| 7,380,860 B2 | 6/2008 | Dolan |
| 7,452,023 B2 | 11/2008 | Hanson et al. |
| 9,045,022 B2 | 6/2015 | Tyrer |
| 2009/0229094 A1 | 9/2009 | Reese |

*Primary Examiner* — Joseph D. Pape
(74) *Attorney, Agent, or Firm* — Barnes & Thornburg LLP

(57) ABSTRACT

An elastic integrally formed windshield retaining clip includes walls defining a frame channel to receive and retain a portion of an upright windshield frame, and walls defining a pane channel to receive and retain a portion of an edge of a windshield while the portion of the upright windshield frame is retained in the frame channel. The frame channel not only surrounds three sides of a windshield frame, but also surrounds the majority of the fourth side of the frame. Angled walls exert pressure against the retained edge of the windshield and the frame.

20 Claims, 18 Drawing Sheets

FLEXIBLE ELASTIC WINDSHIELD RETAINING CLIP

This application is a continuation application of co-pending U.S. patent application Ser. No. 16/100,201, which was filed on Aug. 10, 2018. The disclosure of the above-identified patent application is incorporated herein by reference in its entirety.

FIELD OF THE INVENTION

This invention relates generally to windshield retaining clips for small motor vehicles, and, more particularly, to retaining clips for golf carts and similar vehicles.

BACKGROUND

Many small motor vehicles such as golf carts include a windshield secured to a frame with hardware. Many such windshields include an upper pane connected to a lower pane by a hinge. The hinge allows the upper pane to pivot outwardly from a closed position against the frame, to an open position abutting the lower pane. To facilitate releasing the upper pane from the frame, various clips have been devised. Many such clips include a bendable resilient elastic arm that extends across a portion of the pane at an edge of the pane. Deflecting the arm releases the edge of the pane.

An example of such a clip is described in U.S. Pat. No. RE35757, which describes a windshield retaining clip with a U-shaped windshield clip channel and a frame flange portion which is secured against a frame with a screw. As additional examples, U.S. Pat. Nos. 5,791,720, 5,954,385, 5,975,615, 7,267,388, 9,025,022 each describe a windshield retaining clip with a U-shaped windshield clip channel and a 3-sided U-shaped frame clip portion.

While prior art clips are effective, the 3-sided U-shaped frame clip portion risks coming loose and separating from the windshield frame, especially after extended travel over bumpy terrain. Additionally, the U-shaped frame clip limits the frictional resistance of the clip. Thus, such clips are prone to sliding downwardly, especially after use on bumpy terrain.

What is needed is a reliable, cost effective, easy-to-use windshield retaining clip that provides superior friction and retention, for stable support on a windshield frame. The invention is directed to overcoming one or more of the problems and solving one or more of the needs as set forth above.

SUMMARY OF THE INVENTION

To solve one or more of the problems set forth above, in an exemplary implementation of the invention, an exemplary elastic windshield retaining clip includes walls defining a frame channel to receive and retain a portion of an upright windshield frame, and walls defining a pane channel to receive and retain a portion of an edge of a windshield while the portion of the upright windshield frame is retained in the frame channel. The retaining clip includes an outer wall having a first end, an opposite second end, and a juncture between the first end and the second end, the juncture being an area of connection. An inner wall has a first end and an opposite second end. An intermediate wall extends from the juncture of the outer wall to the first end of the inner wall. The interior wall extends from the second end of the inner wall towards the outer wall. The interior wall includes a first end and an opposite free end. The free end of the interior wall is adjacent to the outer wall. The first end of the interior wall is connected to the second end of the inner wall. The outer wall and the inner wall are parallel. The intermediate wall is perpendicular to the outer wall and perpendicular to the inner wall. The outer wall, inner wall, intermediate wall and interior wall define the frame channel. When the frame channel is not occupied by a portion of a windshield frame, an acute angle is formed by the interior wall and the inner wall in the frame channel.

A retaining wall has a first end and a free end opposite the first end. The first end of the retaining wall is attached to the first end of the outer wall. The retaining wall extends from the first end of the outer wall. The retaining wall and the adjacent intermediate wall define a pane channel. When the pane channel is not occupied by a portion of an edge of a windshield pane, the free end of the retaining wall is closer than the first end of the intermediate wall to the intermediate wall.

The clip is configured to attach to a windshield frame (e.g., a 1".times.1" tubular square cross-section frame) and a windshield pane (e.g., a 3/16" acrylic pane). The distance between the outer wall and the inner wall is about 1 inch. The distance between the intermediate wall and the first end of the inner wall is about 1 inch. The distance between the first end of the retaining wall and the intermediate wall is at least 0.2 inches. Each of the outer wall, inner wall, intermediate wall, interior wall, and retaining wall having an equal height.

In one embodiment, one or more protuberances extend outwardly at least 0.2 inches from the outer side of the retaining wall. The protuberances facilitate gripping and deflecting the retaining wall to receive or release an edge of a windshield pane.

The exemplary clip has a consistent cross section along its entire length. Thus, the exemplary elastic windshield retaining clip may be integrally formed by extrusion. The elastic windshield retaining clip may be comprised of ethylene-propylene-diene terpolymer, or other elastic material suitable for extrusion.

An exemplary windshield retaining system for a windshield uses a plurality of such windshield retaining clips. For example, two clips may support the left side of the windshield, and two clips may support the right side of the windshield. A portion of a windshield frame extends through each frame channel of each clip, while a portion of an edge of a windshield pane extends into a panel channel of each clip. The portion of the frame extending through each frame channel elastically deforms the inner wall of the clip, which exerts pressure against the portion of the frame. A portion of an edge of a windshield extends into the pane channel of each clip and elastically deforms the retaining wall, which exerts pressure against the edge of the windshield.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
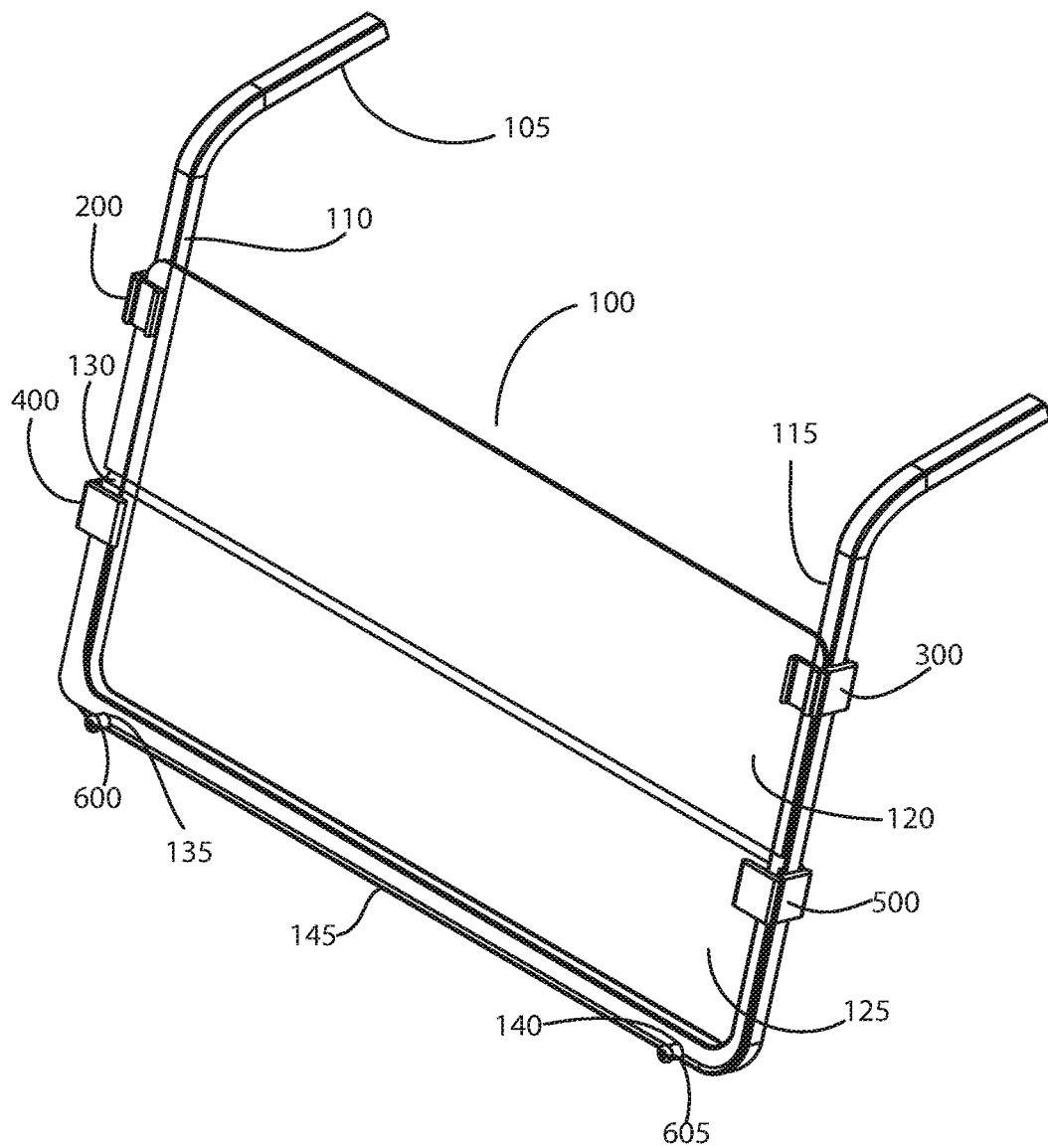
FIG. 1 is a front perspective view of an exemplary windshield assembly including retaining clips according to principles of the invention.

FIG. 1 conceptually illustrates an exemplary windshield assembly 100 for a small motor vehicle such as a golf cart. Retainer clips 200, 300, 400 and 500, according to principles of the invention, grip portions of the frame and portions of the window panels. The exemplary windshield is comprised of two transparent plastic panes 120, 125 connected with a hinge 130. The hinge 130 allows the upper pane 120 to be pivoted outwardly and towards the bottom pane 125. The exemplary frame is comprised of square cross section metal (e.g., steel or aluminum) tube. The frame includes a pair of spaced apart parallel uprights 110, 115 connected at their bottoms by a bottom segment 125. The bottom segment 125 is orthogonal to the uprights 110, 115. The panes 120, 125 extend from one upright 110 to the opposite upright 115. A pair of windshield clips releasably secure each pane to the uprights 110, 115. Upper clips 200, 300 releasably secure the upper pane 120 to the uprights 110, 115. Lower clips 400, 500 releasably secure the lower pane 125 to the uprights 110, 115.

Figure 2:
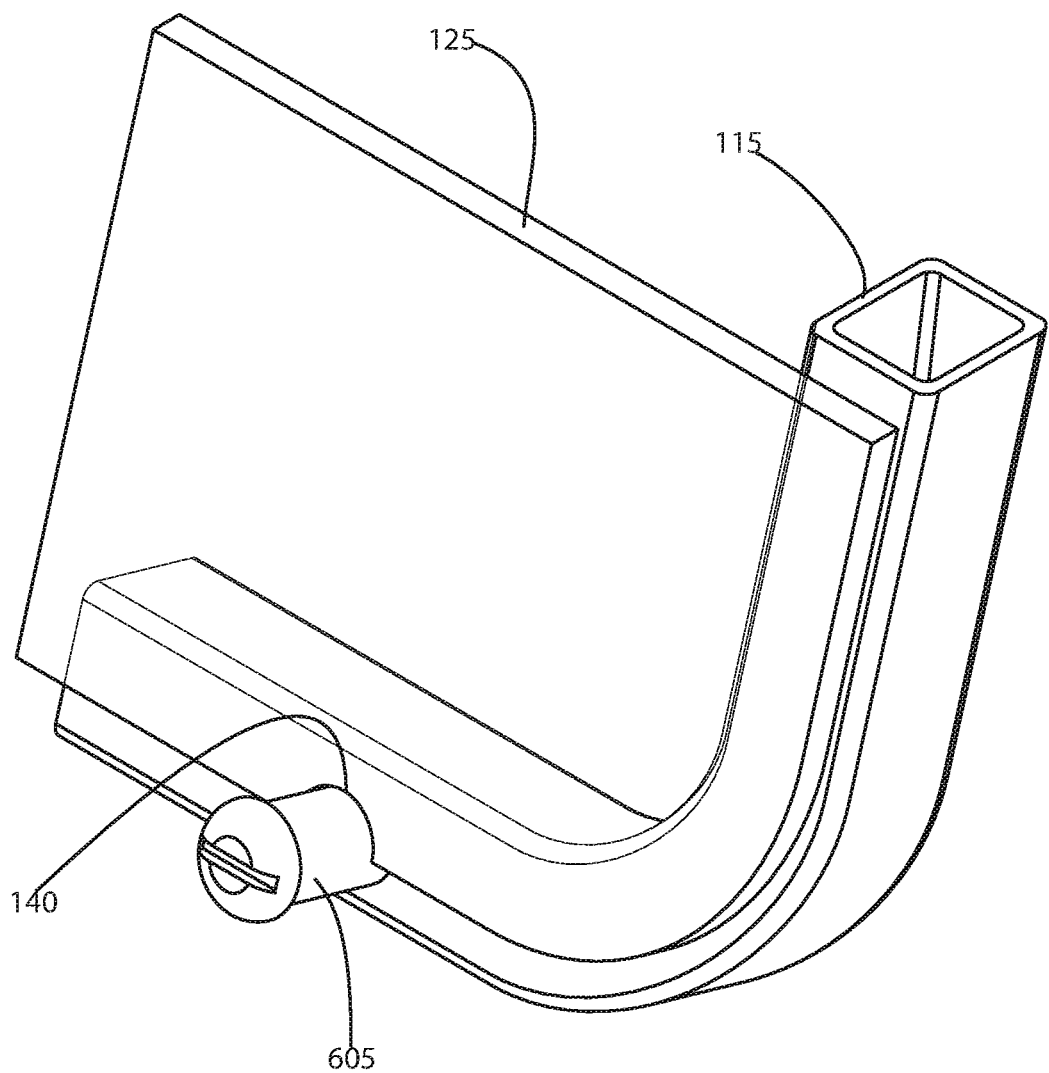
FIG. 2 is a front perspective view of a bottom corner of an exemplary windshield assembly according to principles of the invention.
Figure 3:
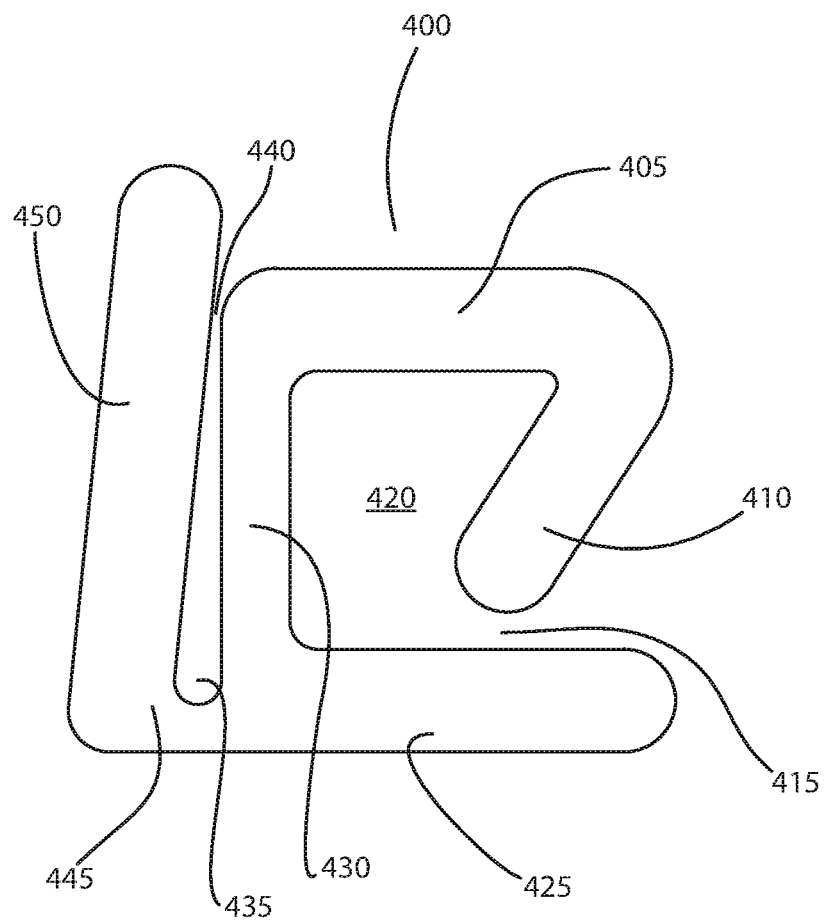
FIG. 3 is a plan view of an exemplary lower windshield retaining clip according to principles of the invention.
Figure 4:
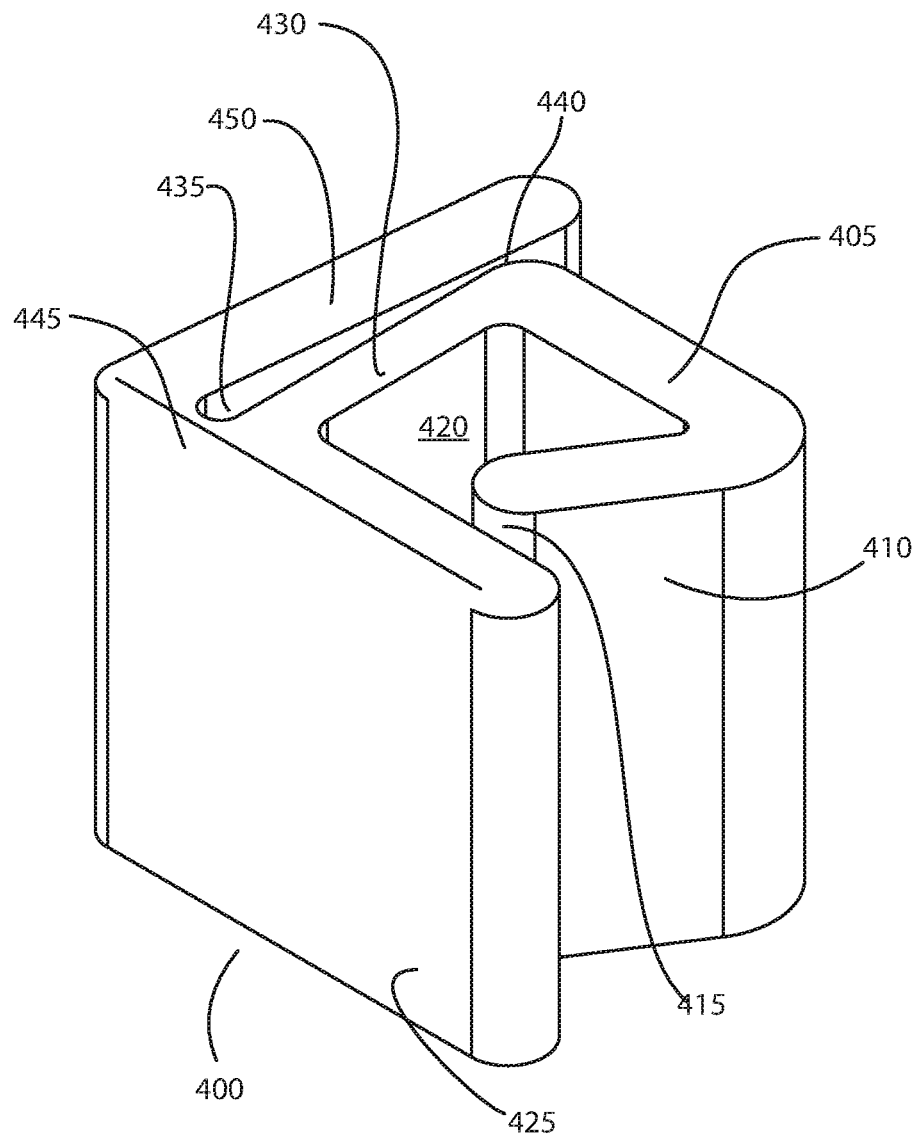
FIG. 4 is a first perspective view of an exemplary lower windshield retaining clip according to principles of the invention.
Figure 5:
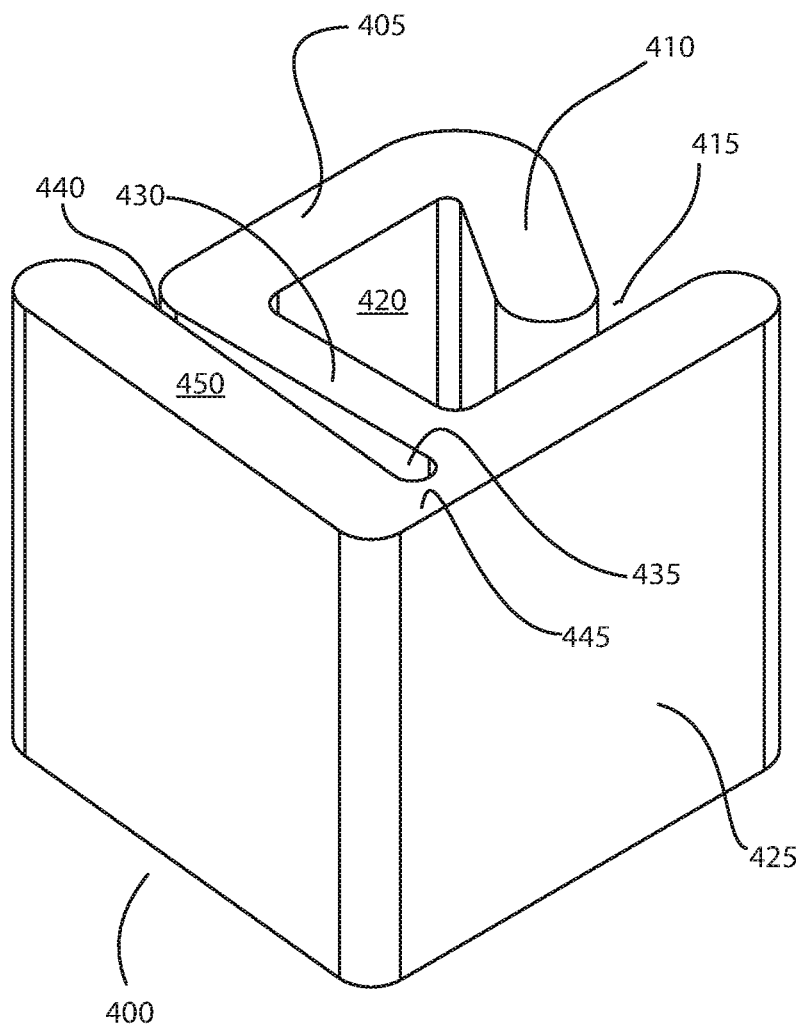
FIG. 5 is a second perspective view of an exemplary lower windshield retaining clip according to principles of the invention.
Figure 6:
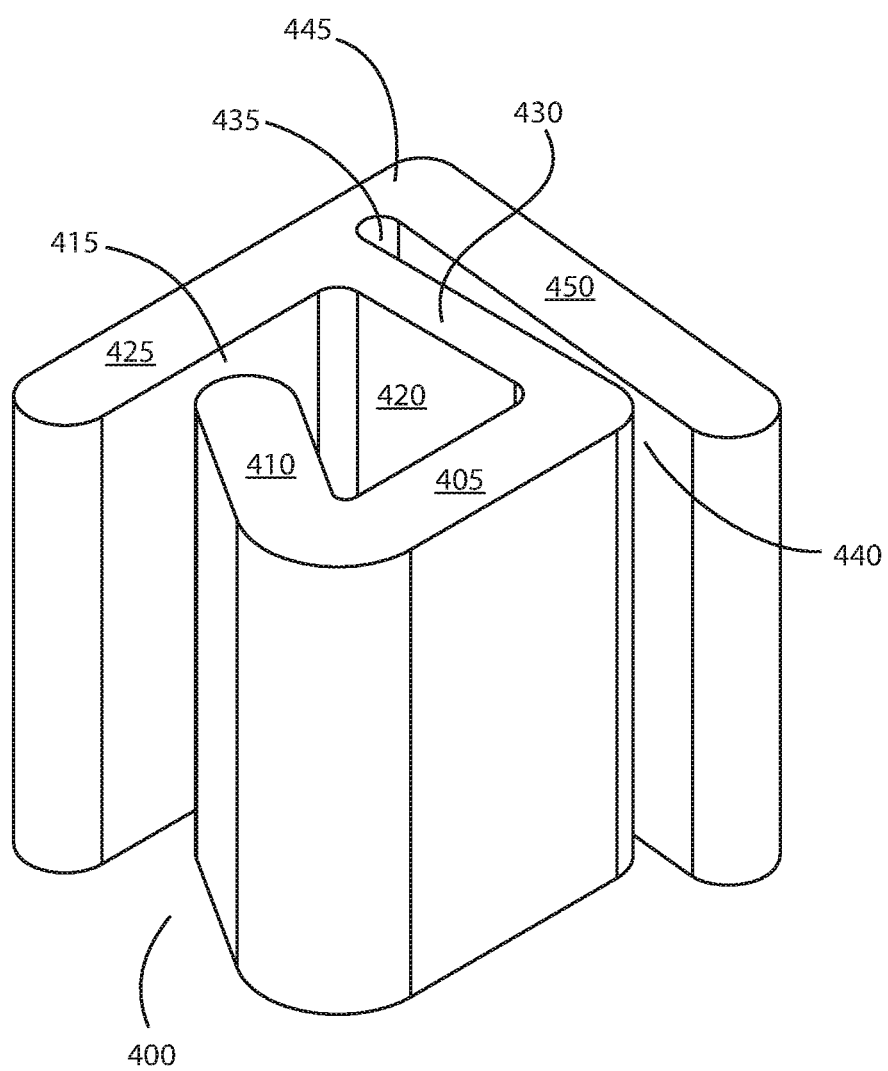
FIG. 6 is a third perspective view of an exemplary lower windshield retaining clip according to principles of the invention.
Figure 7:
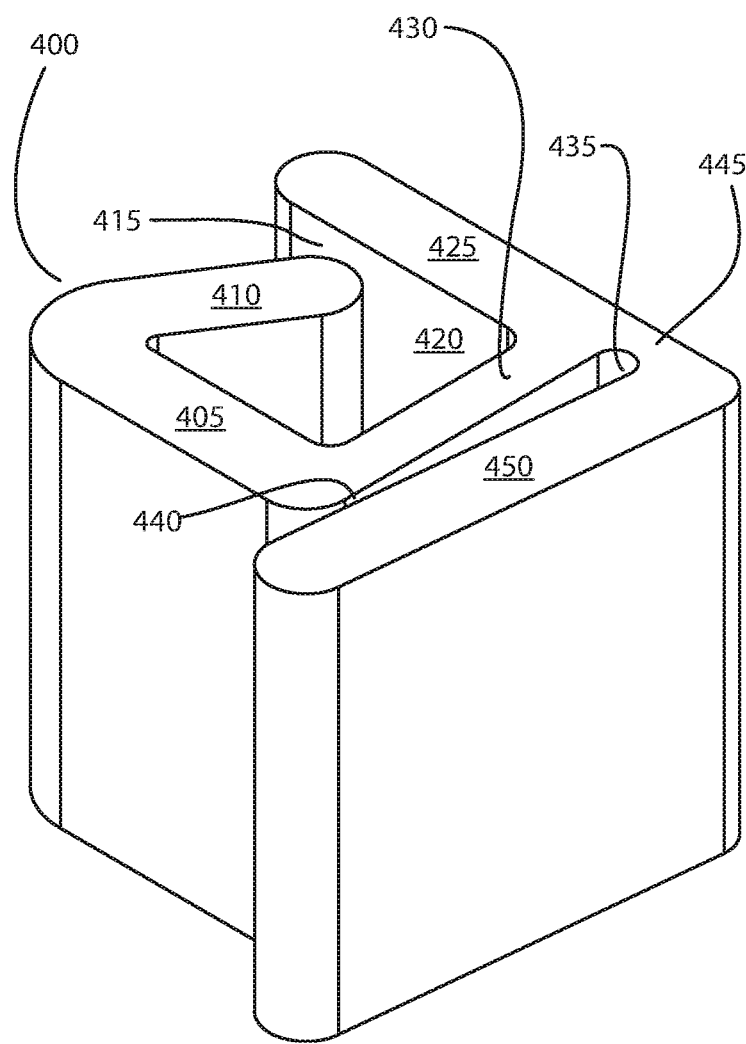
FIG. 7 is a fourth perspective view of an exemplary lower windshield retaining clip according to principles of the invention.
Figure 8:
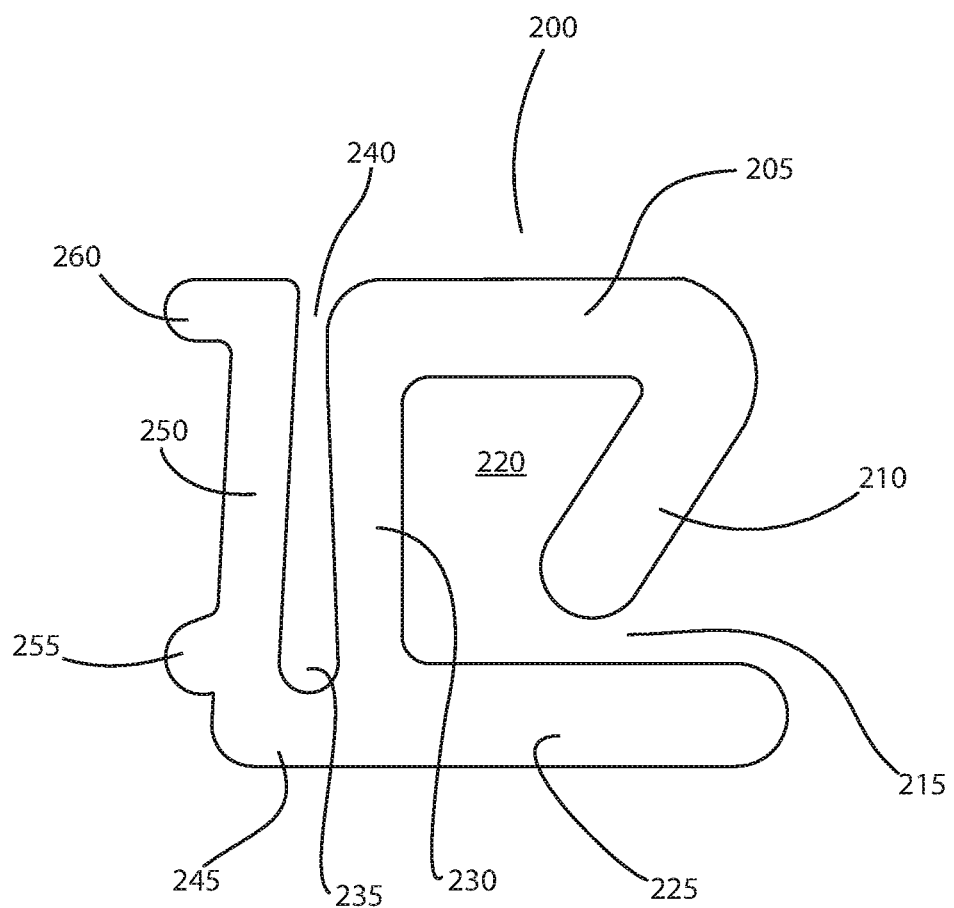
FIG. 8 is a plan view of an exemplary upper windshield retaining clip according to principles of the invention.
Figure 9:
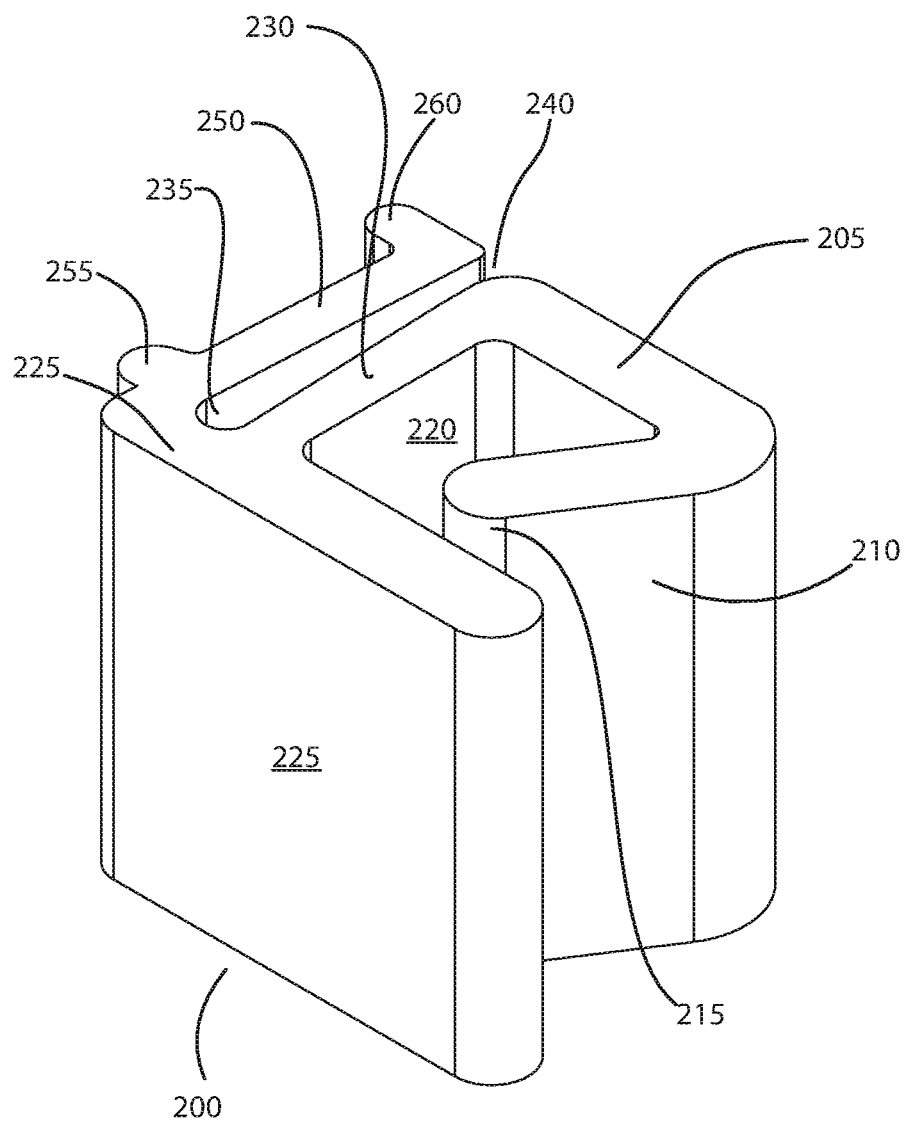
FIG. 9 is a first perspective view of an exemplary upper windshield retaining clip according to principles of the invention.
Figure 10:
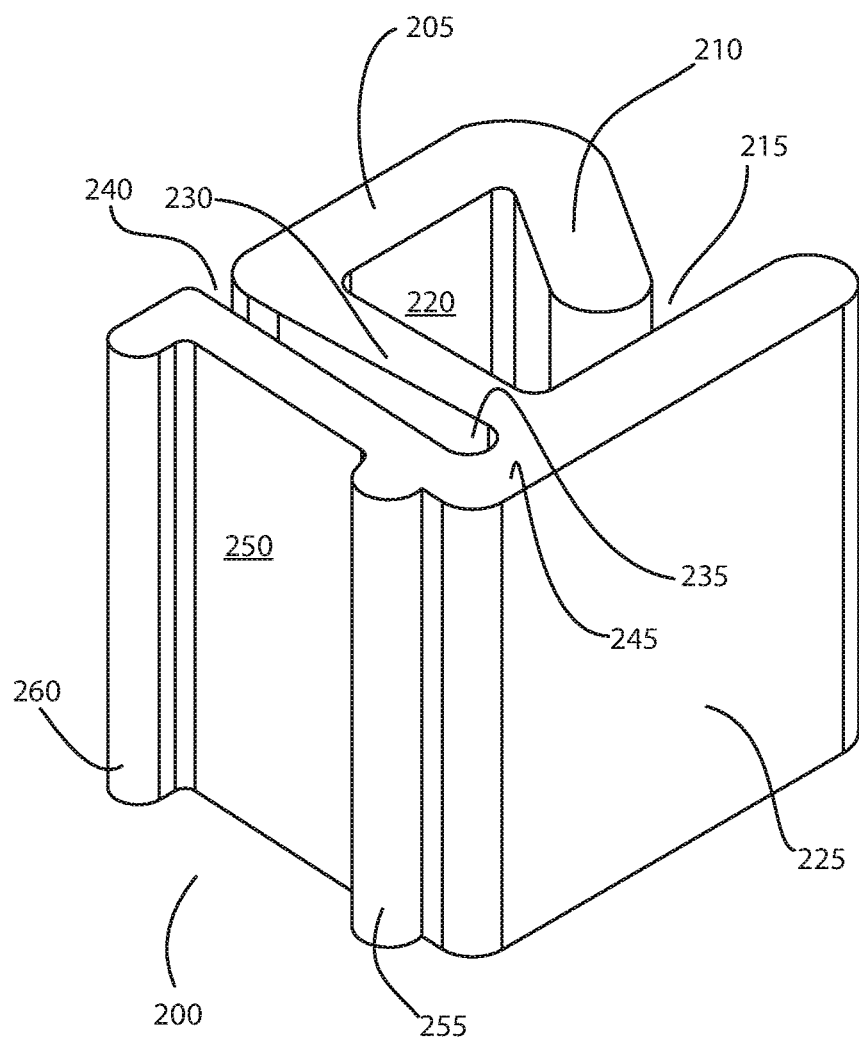
FIG. 10 is a second perspective view of an exemplary upper windshield retaining clip according to principles of the invention.
Figure 11:
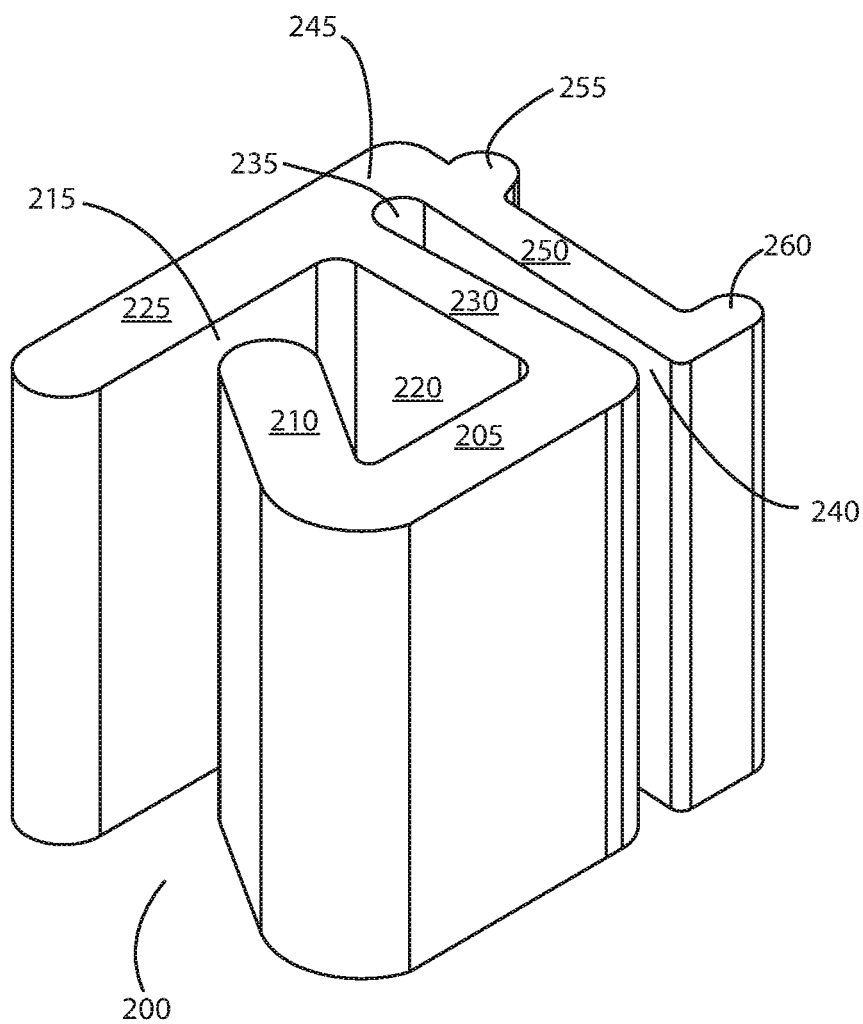
FIG. 11 is a third perspective view of an exemplary upper windshield retaining clip according to principles of the invention.
Figure 12:
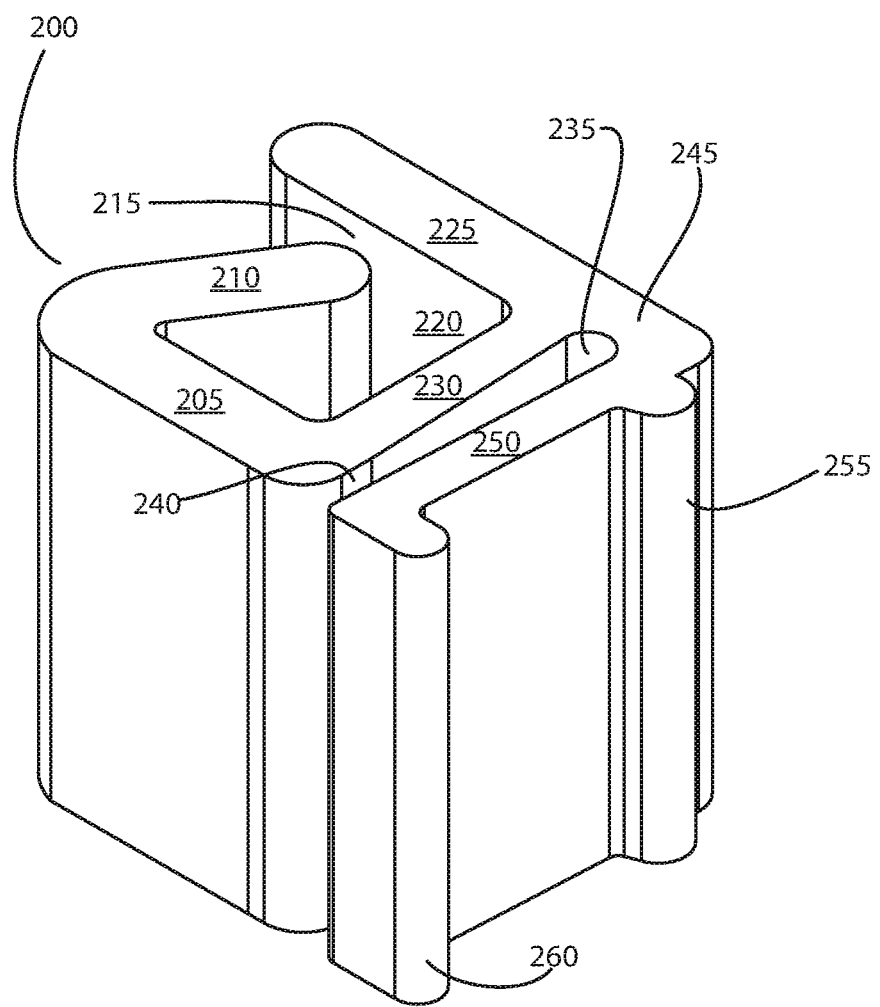
FIG. 12 is a fourth perspective view of an exemplary upper windshield retaining clip according to principles of the invention.

Additionally, the bottom edge of the lower pane 125 includes a pair of notches or slots (e.g., upside-down U-shaped slots 135, 140). A close-up view of a bottom section of the windshield assembly is provided in FIG. 2. Bushings 600, 605 protrude from the frame and align with the slots 135, 140. At least a portion of each bushing 600, 605 is received in each slot 135, 140. The bushings 600, 605 support the bottom pane 125 and prevent the bottom pane 125 from sliding downward and shifting laterally. The bushings 600, 605 are bolted to the bottom segment 125 of the frame, extending outwardly as a bottom support for the slotted bottom edge of the bottom pane 125.

The exemplary windshield assembly 100 is provided as a nonlimiting example of a windshield assembly with which retainer clips 200, 300, 400 and 500, according to principles of the invention may be used. However, the retainer clips 200, 300, 400 and 500, are not limited to use with the exemplary windshield assembly 100. Rather, such retainer clips 200, 300, 400 and 500, may be used with other windshield assemblies, without departing from the scope of the invention.

Upper retainer clips 200-300 are substantially similar to lower retainer retainer clips 400-500. Due to the similarities, they are interchangeable. For example, upper retainer clips 200-300 may be used to retain upper and/or lower panes of a windshield. Similarly, lower retainer clips 400-500 may be used to retain lower and/or upper panes of a windshield. In a preferred implementation, however, upper retainer clips 200-300 are used to retain an upper pane of a windshield, while lower retainer clips 400-500 are used to retain a lower pane of a windshield. Differences between the upper and lower retainer clips are addressed below.

Among the similarities between the upper 200 and lower 400 clips are the tapering of channels. Each clip includes a frame channel, in which a section of a windshield frame is received. Each clip also includes a windshield pane channel, in which an edge of a windshield pane is received. Each of these channels tapers towards its opening. The tapering is a result of the angle of a wall forming the channel. For example, in the lower clip 400, interior wall 410 and retaining wall 450 are each angled to provide a tapered frame channel 420 and a tapered pane channel 435, respectively. Similarly, in the upper clip 200, interior wall 210 and retaining wall 250 are each angled to provide a tapered frame channel 220 and a tapered pane channel 235, respectively. The tapered pane channels 235, 435 are too narrow to receive an edge of a pane, without deflecting the retaining wall 250, 450. Likewise, the tapered frame channels 22, 420 are two narrow to receive a section of a frame, without deflecting the interior wall 210, 410. The deflected retaining walls 250, 450 exert pressure against received edges of panes. The deflected interior walls 210, 410, exert pressure against a side of a received section of a frame, while the other three sides of the received section of the frame are bound by and abut the walls 405, 425, and 430 for the lower clip 400, and walls 205, 225, and 230 for the upper clip 200.

The exerted pressures enhance friction, maintaining the received edge of the pane and section of the frame in the respective channel.

FIGS. 3 through 7 provide various views of a lower retainer clip 400 according to principles of the invention. Such a retainer clip 400 may be used on the right side or on the left side of a windshield frame. The lower clip 400 is an integrally formed structure with a plurality of walls. Some of the walls define a channel 435 (i.e., pane channel) for receiving a portion of a windshield panel. Other walls define a channel 420 (i.e., frame channel) in which a section of a window frame is received. When the clip is installed, the frame channel 420 receives and frictionally engages a portion of the frame, while the windshield channel 435 receives and frictionally engages a portion of an edge of a windshield panel.

The walls forming the clips are panels. A wall may extend from another wall. Walls have ends, even though there may be no discontinuity between a first wall and a second wall extending from the first wall. Ends define extents of a wall. Walls also have a thickness, opposite sides, and a height.

Unlike prior art windshield retainer clips that provide a U-shaped channel for receiving a portion of a windshield frame, a clip according to principles of the invention includes a channel 420 defined by walls that substantially surround the received portion of the window frame. More specifically, the channel 420 is defined by walls that cover 3 sides of a square tube and also cover the majority or entirety of the 4.sup.th side of the square tube.

FIGS. 3 through 7 conceptually illustrate an exemplary lower clip 400 according to principles of the invention. The exemplary lower clip 400 includes an outer wall 445, an opposite inner wall 405, an intermediate wall 430 extending from the outer wall 425 (i.e., from a juncture of the outer wall between the ends of the outer wall) to the inner wall 405, an interior wall 410 extending from the inner wall 405 towards the outer wall 445, and a retaining wall 450 adjacent to the intermediate wall 430 and extends orthogonal from an end 445 of outer wall 445.

Figure 14:
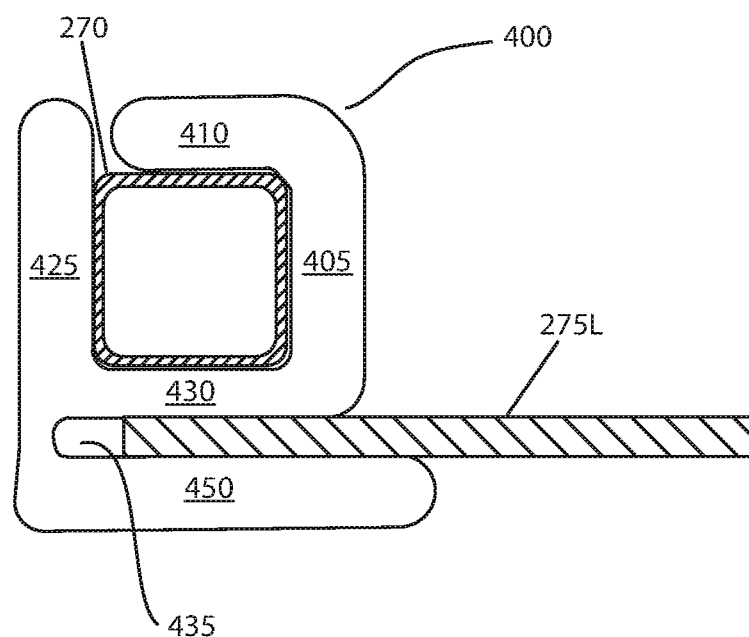
FIG. 14 is a plan view of an exemplary lower windshield retaining clip with an engaged windshield frame and edge of a windshield pane according to principles of the invention.

The outer wall 445, inner wall 405, intermediate wall 430 and interior wall 410 define a frame channel 420 in which a portion of a windshield frame is received. When the frame channel 420 does not contain a frame section, the width of the frame channel 420 decreases towards the outer wall 445. The interior wall 410 can be deflected away from the intermediate wall 430 to provide enough space 415 between the interior wall and outer wall 445 for passage of a portion of a windshield frame. As shown in FIG. 14, when a portion of the windshield frame 270 is contained in the channel 420, the interior wall 410 remains urged away from the intermediate wall 430 by the frame.

The retaining wall 450 and intermediate wall 430, along with the end 445 of the outer wall 445, define a narrow channel 435 in which an engaged portion of a windshield panel is received. The narrow channel 435 tapers towards the opening 440. The retaining wall 450 is deflected away from the intermediate wall 430 to increase the width of the opening 440, for the purpose of receiving an edge of a windshield pane. As shown in FIG. 14, when an edge of a windshield pane 275L is contained in the narrow channel 435, the retaining wall 450 remains urged away from the intermediate wall 430 by the received edge of a windshield pane.

FIGS. 8 through 12 conceptually illustrate an exemplary upper clip 200 according to principles of the invention. The exemplary lower clip 200 includes an outer wall 225, an opposite inner wall 205, an intermediate wall 230 extending from the outer wall 225 to the inner wall 205, an interior wall 210 extending from the inner wall 405 towards the outer wall 225, and a retaining wall 250 adjacent to the intermediate wall 230 and extends orthogonal from an end 245 of outer wall 225.

Figure 13:
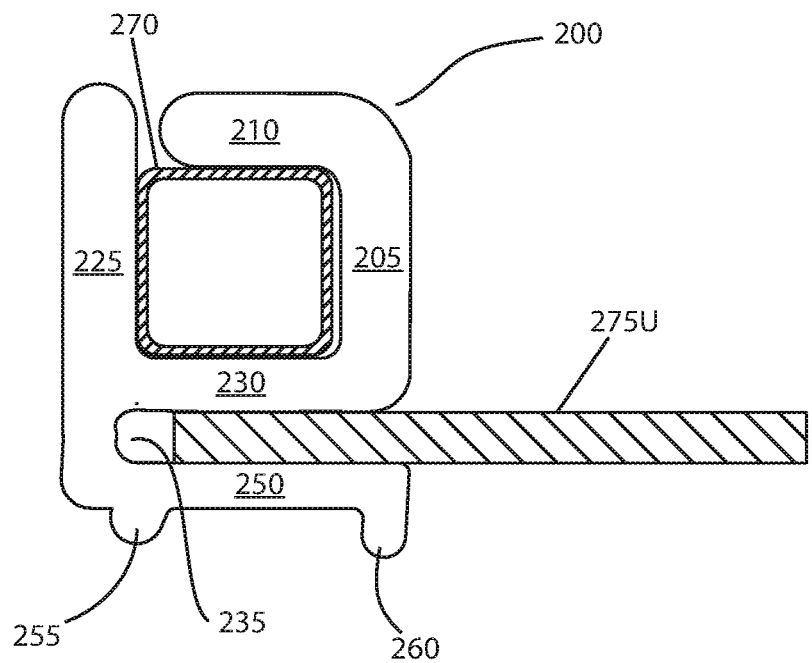
FIG. 13 is a plan view of an exemplary upper windshield retaining clip with an engaged windshield frame and edge of a windshield pane according to principles of the invention.

The outer wall 225, inner wall 205, intermediate wall 230 and interior wall 210 define a frame channel 220 in which a portion of a windshield frame is received. When the frame channel 220 does not contain a frame section, the width of the frame channel 220 decreases towards the outer wall 225. The interior wall 210 can be deflected away from the intermediate wall 230 to provide enough space 215 between the interior wall and outer wall 225 for passage of a portion of a windshield frame. As shown in FIG. 13, when a portion of the windshield frame 270 is contained in the channel 220, the interior wall 210 remains urged away from the intermediate wall 230 by the frame.

The retaining wall 250 and intermediate wall 230, along with the end 245 of the outer wall 225, define a narrow channel 235 in which an engaged portion of a windshield panel is received. The narrow channel 235 tapers towards the opening 240. The retaining wall 250 is deflected away from the intermediate wall 230 to increase the width of the opening 240, for the purpose of receiving an edge of a windshield pane. As shown in FIG. 13, when an edge of a windshield pane 275U is contained in the narrow channel 235, the retaining wall 250 remains urged away from the intermediate wall 230 by the received edge of a windshield pane.

The retaining wall 250 of the upper retainer 200 tends to be deflected more frequently than the retaining wall of 450 of the lower retainer 400. This is due to the fact that the upper pane 120 of a windshield is frequently folded down and raised up. Each time the edge of the pane 120 is engaged or released in the channel 235, the retaining wall 250 is deflected. To facilitate frequent deflection, the retaining wall 250 of the upper retainer 200 may be slightly thinner than the retaining wall 450 of the lower retainer 400.

To further facilitate deflection of the retaining wall 250 of the upper retainer 200, protuberances 255, 260 extend outwardly from the outer side of the retaining wall 250. The protuberances 255, 260 provide a surface upon which a user may apply force to deflect the retaining wall 250. The exemplary protuberances 255, 260 are coextensive with the retaining wall 250, extending from the top to the bottom of the retainer 200. While U-shaped or semicircular protuberances 255, 260 are shown, other shapes may be utilized without departing from the scope of the invention. Additionally, while two protuberances 255, 260 are shown, one or more protuberances may be provided without departing from the scope of the invention.

Figure 15:
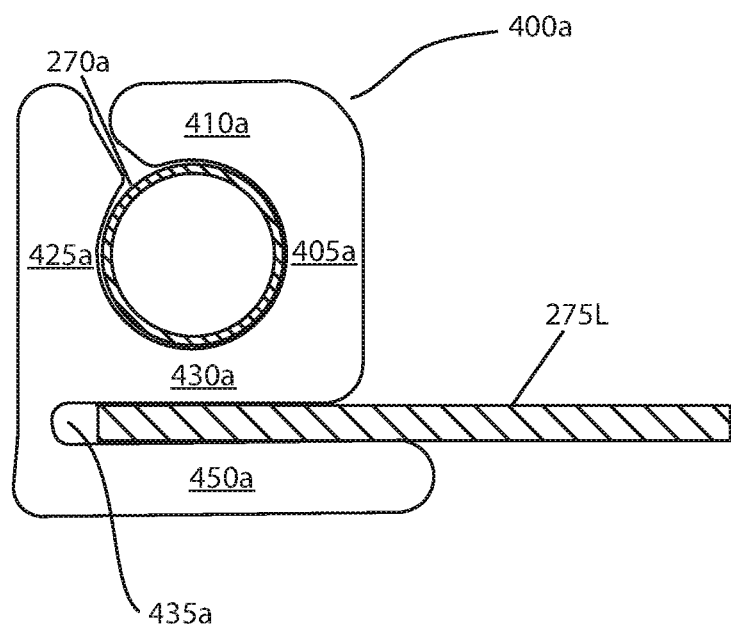
FIG. 15 is a plan view of another exemplary upper windshield retaining clip with an engaged windshield frame and edge of a windshield pane according to principles of the invention.
Figure 16:
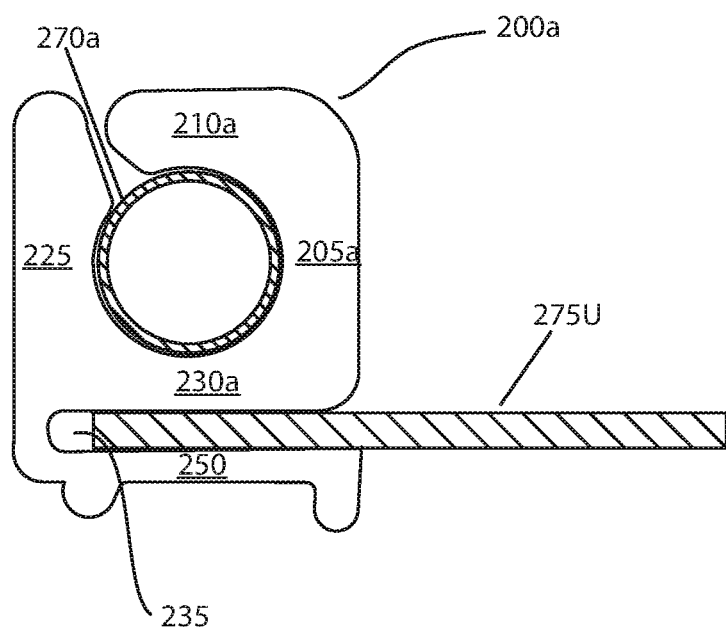
FIG. 16 is a plan view of another exemplary lower windshield retaining clip with an engaged windshield frame and edge of a windshield pane according to principles of the invention.

The invention is not limited to clips configured for use with frame tubes having rectangular (e.g., square) cross section shape. Rather, clips according to principles of the invention may be configured with a contour in the frame channel 220, 420 that generally matches the contour of the received frame section. By way of example, FIGS. 15 and 16 illustrate exemplary embodiments of clips 400a, 200a configured to attach to circular cross-section frame tubing 270a. The interior surfaces of walls 405a, 410a, 425a, 430a, for the lower retainer 400a, are contoured and sized to snugly abut the exterior surface of a circular cross-section frame tubing 270a. Likewise, the interior surfaces of walls 205a, 210a, 225a, 230a, for the upper retainer 200a, are contoured and sized to snugly abut the exterior surface of a circular cross-section frame tubing 270a.

Retainer clips according to principles of the invention may be produced using any suitable manufacturing techniques known in the art for the chosen material, such as (for example) extrusion, injection molding, and compression molding. Preferably the manufacturing technique is suitable for mass production at relatively low cost per unit, and results in an aesthetically acceptable product with a consistent acceptable quality and structural characteristics.

The clips are formed of an elastic resilient material, such as, but not limited to, EPDM (ethylene-propylene-diene terpolymer), with a durometer (Shore A) hardness of at least 40 A, preferably 80 A.+–0.5. Other suitable materials include, but are not limited to, natural rubber, fluoroelastomer (FKM), nitrile-butadiene rubber (NBR), styrene-butadiene rubber (SBR), and silicone.

Figure 17:
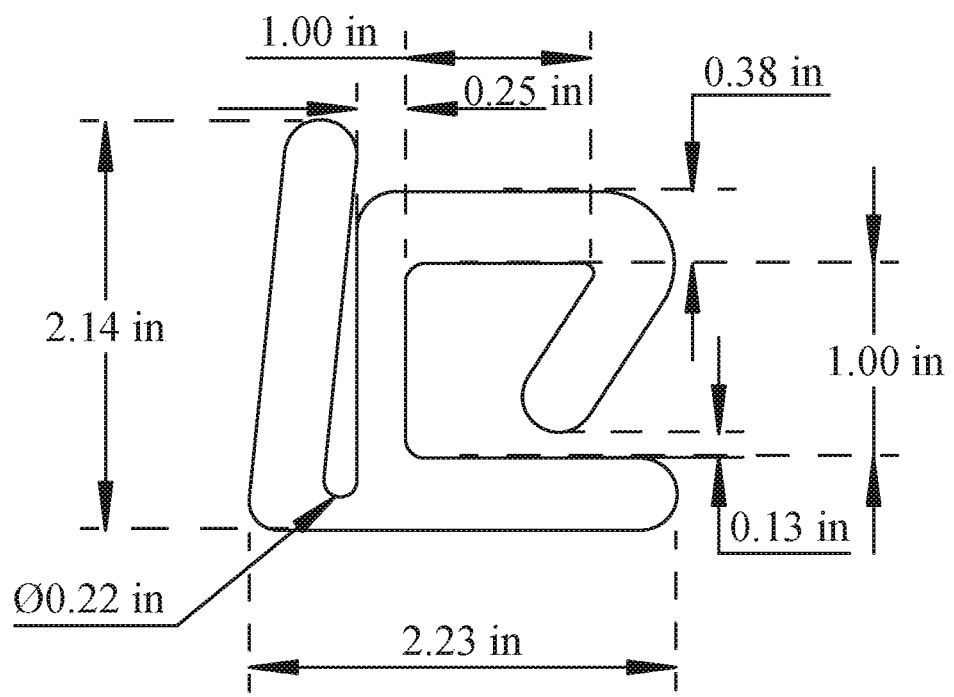
FIG. 17 is a plan view of an exemplary upper windshield retaining clip with dimensions according to principles of the invention.
Figure 18:
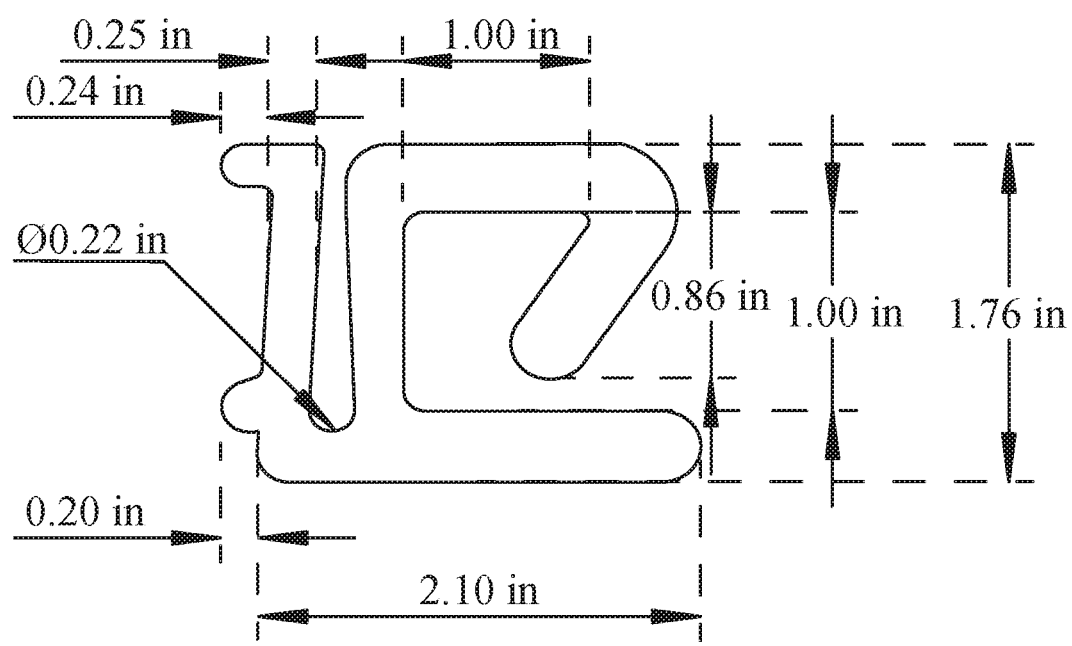
FIG. 18 is a plan view of an exemplary lower windshield retaining clip with dimensions according to principles of the invention.

Nonlimiting examples of dimensioned clips are provided in FIGS. 17 and 18. All dimensions are nonlimiting examples. With two exceptions, dimensions may be varied without departing from the scope of the invention. The two exceptions concern the frame channel and the pane channel. The frame channel must be positioned, shaped and sized to securely receive a section of a windshield frame. Likewise, the pane channel should be positioned, shaped and sized to receive an edge of a windshield pane, while the frame channel receives a section of a windshield frame. The depicted clips are configured to securely receive a section of frame having a 1-inch square cross section. The depicted clips have tapered pane channel with a diameter at the inner curve of about 0.215 inches (rounded to 0.22 inches in the drawings). Such a channel is suitable for engaging windshield panes of 0.125 to 0.25 inches in thickness. Many such windshields are comprised of 0.1875 inch thick acrylic.

In a preferred manufacturing methodology, the clips have uniform cross-sectional shapes over their entire lengths, and are, therefore, readily formed by extrusion. By way of example and not limitation, unvulcanized EPDM is extruded by an extruder to obtain an extruded EPDM material having a predetermined cross-section (e.g., the cross-section of FIGS. 3 and 8). The extruded EPDM material is then vulcanized by a vulcanizer and then cooled. Then, the elongated EPDM extrusion is cut to a predetermined length (the height of the clip).

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

The invention claimed is:

1. A windshield retaining system for a windshield including an upper pane and a lower pane each having a left side and a right side, a plurality of upright frame tubes, including an upright frame tube along the left side of the windshield, and an upright frame tube along the right side of the windshield, the windshield retaining system comprising:
   at least one first elastic windshield retaining clip configured to secure one of the left side and right side of the upper pane of the windshield to an upright frame tube of the plurality of frame tubes, and at least one second elastic windshield retaining clip configured to secure one of the left side and right side of the lower pane of the windshield to an upright frame tube of the plurality of frame tubes, each of the at least one first and second elastic windshield retaining clips including:
      an outer wall having a first end, an opposite second end, and a juncture between the first end and the second end, the juncture being an area of connection;
      an inner wall having a first end and an opposite second end, the outer wall and the inner wall being parallel;
      an intermediate wall extending from the juncture of the outer wall to the first end of the inner wall;
      an interior wall extending from the second end of the inner wall towards the outer wall, the interior wall including a first end and an opposite free end, the free end of the interior wall being adjacent to the outer wall such that a first distance defined between the outer wall and the free end of the interior wall is less than a second distance defined between the inner wall and the free end of the interior wall, the first end of the interior wall being connected to the second end of the inner wall, wherein the outer wall, inner wall, intermediate wall and interior wall defining a frame channel; and
   a retaining wall having a first end and a free end opposite the first end of the retaining wall, the first end of the retaining wall attached to the first end of the outer wall, and the retaining wall extending from the first end of the outer wall, the retaining wall being adjacent to the intermediate wall and the retaining wall and intermediate wall defining a pane channel, each retaining wall having an outer side and an opposite inner side facing the intermediate wall,
   wherein a width of the retaining wall is defined between the outer side and the inner side of the retaining wall, and
   wherein the width of the retaining wall of the at least one first elastic windshield retaining clip is thinner than the width of the retaining wall of the at least one second elastic windshield retaining clip.

2. The windshield retaining system of claim 1, wherein an acute angle is formed by the interior wall and the inner wall in the frame channel of each elastic windshield retaining clip.

3. The windshield retaining system of claim 1, wherein the intermediate wall of each elastic windshield retaining clip is perpendicular to the outer wall and perpendicular to the inner wall.

4. The windshield retaining system of claim 1, wherein the free end of the retaining wall of each elastic windshield retaining clip is closer than the first end of the intermediate wall to the intermediate wall.

5. The windshield retaining system of claim 1, wherein a first distance between the outer wall and the inner wall of each elastic windshield retaining clip is about 1 inch.

6. The windshield retaining system of claim 1, wherein a second distance between the intermediate wall and the first end of the inner wall of each elastic windshield retaining clip is about 1 inch.

7. The windshield retaining system of claim 1, wherein the distance between the first end of the retaining wall and the intermediate wall of each elastic windshield retaining clip is at least 0.2 inches.

8. The windshield retaining system of claim 1, wherein each of the outer wall, inner wall, intermediate wall, interior wall, and retaining wall of each elastic windshield retaining clip has an equal height.

9. The windshield retaining system of claim 1, wherein the at least one first elastic windshield retaining clip further comprises at least one protuberance extending outwardly at least 0.2 inches from the outer side of the retaining wall and extending along the entirety of a height of the outer side of the retaining wall.

10. The windshield retaining system of claim 1, wherein the at least one first elastic windshield retaining clip further comprises a plurality of protuberances extending outwardly at least 0.2 inches from the outer side of the retaining wall and extending along the entirety of a height of the outer side of the retaining wall.

11. The windshield retaining system of claim 9, wherein each elastic windshield retaining clip is integrally formed by extrusion.

12. The windshield retaining system of claim 11, wherein each elastic windshield retaining clip is comprised of ethylene-propylene-diene terpolymer.

13. An elastic windshield retaining clip comprising:
an outer wall having a first end, an opposite second end, and a juncture between the first end and the second end, the juncture being an area of connection;
an inner wall having a first end, an opposite second end, an outer surface facing the outer wall, and an inner surface opposite the outer surface, the outer wall and the inner wall being parallel;
an intermediate wall extending from the juncture of the outer wall to the first end of the inner wall;
an interior wall extending from the second end of the inner wall towards the outer wall, the interior wall including a first end and an opposite free end, the free end of the interior wall being adjacent to the outer wall, the first end of the interior wall being connected to the second end of the inner wall, wherein the outer wall, inner wall, intermediate wall and interior wall define a frame channel; and
a retaining wall having a first end and a free end opposite the first end of the retaining wall, the first end of the retaining wall attached to the first end of the outer wall, and the retaining wall extending from the first end of the outer wall, the retaining wall being adjacent to the intermediate wall and the retaining wall and intermediate wall defining a pane channel,
wherein an entirety of the extent of the retaining wall has a constant width, and
wherein the free end of the retaining wall extends beyond a plane defined by the inner surface of the inner wall.

14. The elastic windshield retaining clip of claim 13, wherein an acute angle is formed by the interior wall and the inner wall in the frame channel of each elastic windshield retaining clip.

15. The elastic windshield retaining clip of claim 13, wherein the free end of the retaining wall of each elastic windshield retaining clip is closer than the first end of the intermediate wall to the intermediate wall.

16. The elastic windshield retaining clip of claim 13, wherein a first distance between the outer wall and the inner wall of each elastic windshield retaining clip is about 1 inch.

17. The elastic windshield retaining clip of claim 13, wherein a first distance defined between the outer wall and the free end of the interior wall is less than a second distance defined between the inner wall and the free end of the interior wall.

18. The elastic windshield retaining clip of claim 13, wherein the retaining wall includes an inner side and an outer side, the inner side faces the intermediate wall, the outer side is opposite the inner side, and the elastic windshield retaining clip further comprises at least one protuberance extending outwardly at least 0.2 inches from the outer side of the retaining wall and extending along the entirety of a height of the outer side of the retaining wall.

19. The elastic windshield retaining clip of claim 13, wherein a first portion of the outer wall defined between the first end of the outer wall and the junction has a thickness that is less than a second portion of the outer wall defined between the junction and the second end of the outer wall.

20. The elastic windshield retaining clip of claim 13, wherein the outer wall includes an outer surface and an inner surface opposite the outer surface and facing the inner wall, and wherein a length of the retaining wall defined between the outer surface of the outer wall and the free end of the retaining wall is at least two times greater than a distance defined between the inner surface of the outer wall and the outer surface of the inner wall.

* * * * *